United States Patent [19]
Gaynor

[11] Patent Number: 5,744,187
[45] Date of Patent: Apr. 28, 1998

[54] NUTRITIONAL POWDER COMPOSITION

[76] Inventor: Mitchel L. Gaynor, 1070 Park Ave., Ste 1E, New York, N.Y. 10128

[21] Appl. No.: 767,584

[22] Filed: Dec. 16, 1996

[51] Int. Cl.$^6$ .................................................. A23L 2/02
[52] U.S. Cl. .......... 426/599; 426/575; 426/577; 426/597; 426/590; 426/601; 426/615; 426/636; 426/640; 426/656; 426/810
[58] Field of Search .................... 426/590, 575, 426/577, 615, 636, 640, 597, 601, 656, 810, 599

[56] References Cited

U.S. PATENT DOCUMENTS

| | | | |
|---|---|---|---|
| 4,180,595 | 12/1979 | Lauredan | 426/590 |
| 4,348,379 | 9/1982 | Kowalsky et al. | 426/810 |
| 4,426,397 | 1/1984 | Schanze | 426/590 |
| 4,524,084 | 6/1985 | Schirmann | 426/590 |
| 4,810,517 | 3/1989 | Glittenberg et al. | 426/810 |
| 5,153,019 | 10/1992 | Hammond | 426/590 |
| 5,248,503 | 9/1993 | Emanuel-King | 426/590 |
| 5,437,880 | 8/1995 | Takaichi et al. | 426/590 |
| 5,514,666 | 5/1996 | Cerda et al. | 426/590 |

*Primary Examiner*—Helen Pratt
*Attorney, Agent, or Firm*—Schweitzer Cornman Gross & Bondell LLP

[57] ABSTRACT

A composition of natural and herbal products which may be compounded in dry form into a mixture which is readily soluble in a fluid for ingestion by humans. When digested, the mixture provides users with an energy boost and associated feelings of well being when the mixture is taken as part of a regular regimen to supplement normal nutritional intakes and to supplement any therapeutic processes to which the users may be subject.

2 Claims, No Drawings

NUTRITIONAL POWDER COMPOSITION

BACKGROUND OF THE INVENTION

The homeopathic medical literature is replete with formulae for curatives and palliatives for every imaginable injury and disease. Over the ages, the widespread adoption and usage of myriad herbal based medicines, salves, potions and tonics have been prescribed by healthcare professionals, nutritionists, and others in many cultures, often with highly beneficial results. The present invention is directed to a composition of natural and herbal products which may be compounded in dry form into a mixture which is readily soluble in a fluid for ingestion by humans. Specifically, the new mixture, when digested, has provided users of the same with an energy boost and associated feelings of well being when the mixture is taken as part of a regular regimen to supplement normal nutritional intakes and to supplement any therapeutic processes to which the users may be subject.

While no therapeutic claims are made in this patent application for the mixture of the present invention, it has been observed that the usage of the mixture of the invention has had beneficial palliative effects on certain terminal cancer patients for whom the mixture has been prescribed as a supplement to traditional chemotherapy and/or radiation therapy.

The new mixture of the present invention is compounded in dry form for dissolving in a fluid such as water or fruit juice and, most advantageously, tomato juice before usage. The mixture of the invention, which has been found to be palliative, includes a combination of specific algae powders with a series of specific green grass juice powders along with a series of Chinese herbs and western herbs, further combined with mushroom powder and a specific series of oils, seed extracts, fibers, royal jelly, and bee pollen. This highly esoteric combination, as more specifically described hereinafter, has had unexpected beneficial effects.

DETAILED DESCRIPTION OF THE PRESENT INVENTION

In accordance with the present invention, a beneficial palliative nutritional drink may be formed by combining approximately 10 to 20 ounces of water, fruit juice, or most advantageously tomato juice with the following mixture of dried natural and herbal ingredients:

Algae Powders:

One or more of:

| | | |
|---|---|---|
| Spirulina | about | 1356 mg. |
| Klamath Lake Blue Green | about | 1500 mg. |
| CGC Chlorella | about | 350 mg. |
| Australian Dunaliella Salina | about | 40 mg. |
| Red Dumontiacae | about | 40 mg. |
| Wildcrafted-Longicrusis | about | 40 mg |
| Digitata Kelp | about | 40 mg. |
| Bladderwrack | about | 40 mg. |
| Irish Moss | about | 40 mg. |
| Pulse | about | 20 mg. |
| Alaria | about | 20 mg. |

Green Grass Juice Powders:

One or more of:

| | | |
|---|---|---|
| Kamut grass | about | 1350 mg. |
| Barley grass | about | 1350 mg. |
| Oat Grass | about | 1350 mg. |
| Wheat grass | about | 1350 mg. |
| Barley grass | about | 1350 mg. |
| Spelt grass | about | 1350 mg. |
| Alfalfa grass | about | 1350 mg. |
| Sinach Octacosanol | about | 1350 mg. |

Chinese Herbs:

One or more of:

| | | |
|---|---|---|
| Siberian Ginseng | about | 60 mg. |
| Astragalus | about | 60 mg. |
| Tang-Kuei | about | 60 mg. |
| Rehmania | about | 60 mg |
| Fo-ti | about | 60 mg. |
| Atrartylodes | about | 60 mg. |
| Hoelen | about | 60 mg. |
| Codonopsis | about | 60 mg. |
| Schizandra | about | 60 mg. |
| Peony Alba | about | 60 mg. |
| Polygala | about | 60 mg. |
| Ginger | about | 60 mg. |
| Citrus Peel | about | 60 mg. |
| Licorice | about | 120 mg. |
| Wallachi | about | 60 mg. |
| Jujuba | about | 60 mg. |

Western Herbs:

One or more of:

| | | |
|---|---|---|
| Ginkgo Biloba | about | 700 mg. |
| Red Clover | about | 60 mg. |
| Nettles | about | 60 mg. |
| Burdock root | about | 60 mg. |
| Yellow dock | about | 60 mg. |
| Skullcap | about | 60 mg. |
| Dandelion | about | 60 mg. |
| Parsley | about | 60 mg. |
| Jerusalem Artichoke | about | 60 mg. |
| Rose hips | about | 60 mg. |
| Milk thistle | about | 120 mg. |
| Echinacie Angustifolia | about | 120 mg. |

Mushroom Powders:

One or more of:

| | | |
|---|---|---|
| *Ganoderma lucidum* | about | 600 mg. |
| *Cordyceps sinensis* | about | 400 mg. |
| *Grifola frondosus* | about | 400 mg. |
| *Lentinus edodes* | about | 600 mg. |
| *Tremella fuciformis* | about | 400 mg. |

Additional Nutrients

One or more of:

| | | |
|---|---|---|
| High pectin apple fiber | about | 1350 mg. |
| Soy lecithin | about | 4250 mg |
| Brown rice germ | about | 700 mg. |
| Royal jelly | about | 1000 mg. |
| Montana bee pollen | about | 1160 mg. |
| Acerola berry juice powder | about | 230 mg. |
| Japanese Sensia Green Tea | about | 40 mg. |
| Grapeseed Extract | about | 40 mg. |
| European billberry | about | 20 mg. |
| Flaxseed oil | about | 4000 mg. |
| L-Carnitine | about | 500 mg. |

The aforementioned dried ingredients are appropriately blended into unit portions which advantageously may be prepackaged into individual envelopes for later usage before they are mixed in the fluid selected for the preparation of the new potion of the present invention.

While a mixture formed from all of the aforementioned ingredients has been determined by initial testing on a series of terminal cancer patients to have beneficial palliative effects on the patients, it will be understood by those skilled in the art that certain qualitative and quantitative variations in the aforementioned formulation of the nutritional base mixture may be made without deleterious effect on the efficacy of the disclosed mixture. Indeed, by reducing the amount of fluid with which the mixture of dried ingredients is mixed, should it be desired, the nutritional powder composition of the present invention may be prepared as a food paste or spread rather than as a potable solution.

I claim:

1. A beneficial palliative nutritional drink comprising:

(a) a liquid selected from the group consisting of water, fruit juice, and tomato juice;

(b) an algae powder selected from the group consisting of Spirulina, Klamath Lake Blue Green, CGC Chlorella, Australian Dunaliella Salina, Red Dumontiacae, Wildcrafted-Longicrusis, Digitata Kelp, Bladderwrack, Irish Moss, Pulse, and Alaria;

(c) a green grass juice powder selected from the group consisting of Kamut grass, Barley grass, Oat grass, Wheat grass, Spelt grass, alfalfa grass, and Sinach Octacosanol;

(d) a Chinese herb selected from the group consisting of Siberian Ginseng, Astragalus, Tang-Kuei, Rehmania, Fo-ti, Atrartylodes, Hoelen, Codonopsis, Schizandra, Peony Alba, Polygala, Ginger, Citrus peel, Licorice, Wallachi, and Jujuba;

(e) a western herb selected from the group consisting of Ginkgo Biloba, Red Clover, Nettles, Burdock root, Yellow dock, Skullcap, Dandelion, Parsley, Jerusalem Artichoke, Rose hips, Milk thistle, and Echinacie Angustifolia;

(f) a mushroom powder selected from the group consisting of *Ganoderma lucidum*, *Cordyceps sinensis*, *Grifola frondosus*, *Lentinus edodes*, and *Tremella fuciformia*; and (g) an additional nutrient selected from the group consisting of high pectin apple fiber, soy lecithin, brown rice germ, Royal jelly, Montana bee pollen, Acerola berry juice powder, Japanese Sensia Green Tea, Grapeseed Extract, European billberry, Flaxseed oil, and L-Carnitine.

2. A palliative nutritional drink as in claim 1, further comprising (a) about 10 to 20 ounces of said liquid;

(b) said algae powder being selected from the group consisting of:

| Spirulina | about 1356 mg. |
|---|---|
| Klamath Lake Blue Green | about 1500 mg. |
| CGC Chlorella | about 350 mg. |
| Australian Dunaliella Salina | about 40 mg. |
| Red Dumontiacae | about 40 mg. |
| Wildcrafted-Longicrusis | about 40 mg |
| Digitata Kelp | about 40 mg. |
| Bladderwrack | about 40 mg. |
| Irish Moss about | about 40 mg. |
| Pulse | about 20 mg., and |
| Alaria | about 20 mg. |

(c) said green grass juice powder being selected from the group consisting of:

| Kamut grass | about 1350 mg. |
|---|---|
| Barley grass | about 1350 mg. |
| Oat Grass | about 1350 mg. |
| Wheat grass | about 1350 mg. |
| Spelt grass | about 1350 mg. |
| Alfalfa grass | about 1350 mg., and |
| Sinach Octacosanol | about 1350 mg. |

(d) said Chinese herbs being selected from the group consisting of:

| Siberian Ginseng | about 60 mg. |
|---|---|
| Astragalus | about 60 mg. |
| Tang-Kuei | about 60 mg. |
| Rehmania | about 60 mg |
| Fo-ti | about 60 mg. |
| Atrartylodes | about 60 mg. |
| Hoelen | about 60 mg. |
| Codonopsis | about 60 mg. |
| Schizandra | about 60 mg. |
| Peony Alba | about 60 mg. |
| Polygala | about 60 mg. |
| Ginger | about 60 mg. |
| Citrus Peel | about 60 mg. |
| Licorice | about 120 mg. |
| Wallachi | about 60 mg., and |
| Jujuba | about 60 mg. |

(e) said western herbs being selected from the group consisting of:

| Ginkgo Biloba | about 700 mg. |
|---|---|
| Red Clover | about 60 mg. |
| Nettles | about 60 mg. |
| Burdock root | about 60 mg. |
| Yellow dock | about 60 mg. |
| Skullcap | about 60 mg. |
| Dandelion | about 60 mg. |
| Parsley | about 60 mg. |
| Jerusalem Artichoke | about 60 mg. |
| Rose hips | about 60 mg. |
| Milk thistle | about 120 mg., and |
| Echinacie Angustifolia | about 120 mg. |

(f) a mushroom powder selected from the group consisting of:

| *Ganoderma lucidum* | about 600 mg. |
|---|---|
| *Cordyceps sinensis* | about 400 mg. |
| *Grifola frondosus* | about 400 mg. |
| *Lentinus edodes* | about 600 mg., and |
| *Tremella fuciformis* | about 400 mg. |

(g) and an additional nutrient selected from the group consisting of:

| High pectin apple fiber | about 1350 mg. |
|---|---|
| Soy lecithin | about 4250 mg |
| Brown rice germ | about 700 mg. |
| Royal jelly | about 1000 mg. |
| Montana bee pollen | about 1160 mg. |
| Acerola berry juice powder | about 230 mg. |
| Japanese Sensia Green Tea | about 40 mg. |
| Grapeseed Extract | about 40 mg. |
| European billberry | about 20 mg. |
| Flaxseed oil | about 4000 mg., and |
| L-Carnitine | about 500 mg. |

* * * * *